UNITED STATES PATENT OFFICE.

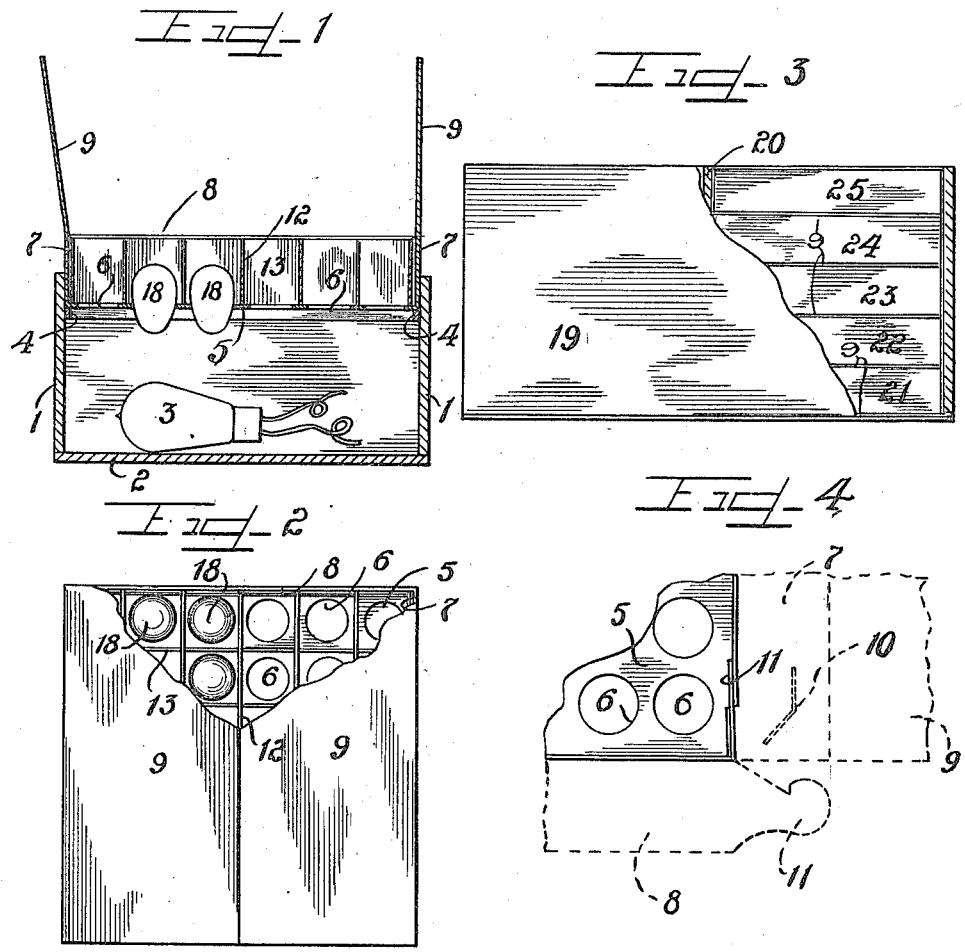

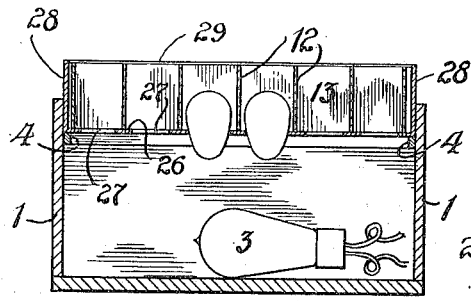
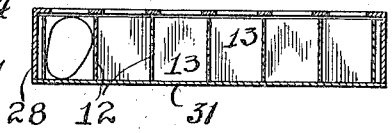
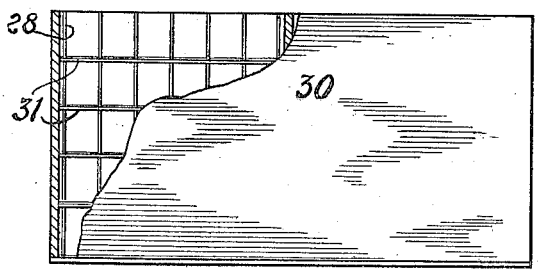
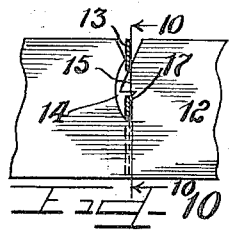
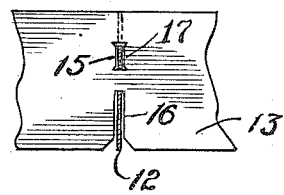
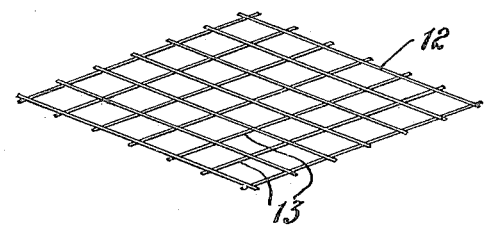

ALEX L. ANDERSON AND WILLIAM V. PURDY, OF BEATRICE, NEBRASKA.

EGG PACKING AND TESTING DEVICE.

1,197,996. Specification of Letters Patent. Patented Sept. 12, 1916.

Application filed July 23, 1914. Serial No. 852,563.

*To all whom it may concern:*

Be it known that we, ALEX L. ANDERSON and WILLIAM V. PURDY, citizens of the United States, and residents of the city of Beatrice, in the county of Gage and State of Nebraska, have invented certain new and useful Improvements in Egg Packing and Testing Devices; and we do hereby declare that the following is a full, clear, and exact description of the same, reference being had to the accompanying drawings, and to the numerals of reference marked thereon, which form a part of this specification.

One of the simplest methods for testing for good and bad eggs is by the well known process of candling, and although the original candle itself has been superseded by more modern devices and methods of illumination, the procedure is practically the same. A serious objection at the present time to this method, however, is the numerous operations necessitated, as each individual egg must be separately handled by the tester, and consequently the packing and unpacking of the eggs has resulted in loss of time and inconvenience. By our invention, however, the necessity of handling each egg individually for testing is entirely obviated, the packing device or cartons for the eggs being so constructed that the same are readily utilizable as a part of a testing device in testing a number of eggs simultaneously.

It is an object of this invention to construct a carton in which eggs are packed for shipping, so constructed as to afford a part of a testing apparatus for candling the eggs without necessitating unpacking or removal of the eggs, and affording an exceedingly efficient and easily manipulated device for convenient and rapid work on the part of the tester.

It is also an object of this invention to construct a collapsible carton provided with a plurality of apertures therein slightly smaller than an egg, so that during a testing operation the eggs fit therein in an upright position, thus sealing the light from a source of illumination, permitting a number of eggs to be inspected simultaneously and a comparative examination made thereof.

It is also an important object of this invention to construct a testing device and packing carton for eggs embracing a cardboard or fiber casing, the bottom of which is provided with a plurality of apertures and with a removable collapsible partition member insertible therein with the respective partitions each forming a compartment around an aperture, so that an egg in the compartment may, when the carton is inverted, fit into the aperture, assuming an upright position therein and sealing the light therearound, thus permitting ready inspection and testing of all of the eggs simultaneously.

It is also an important object of this invention to construct a collapsible carton, a number of which may be packed in inverted position one upon another in a crate, and each carton containing a number of eggs, said cartons constructed so that when fitted over an illumination box, permit ready examination of the eggs, the eggs fitting into apertures in the bottom of the carton, sealing the light from below, affording an efficient candle test for comparative examination of the eggs.

It is furthermore an important object of this invention to provide a carton in which eggs may be packed and shipped, so constructed as to permit inspection or candle testing of the eggs at any time without necessitating removal of the eggs from the carton for individual testing of the eggs.

It is finally an object of this invention to construct a testing container for eggs in which eggs may be packed for shipment from place to place, said container adapted to be readily collapsed, so that the same may be returned and used again, and constructed to permit testing of the eggs to be effected without unpacking of the eggs.

The invention (in a preferred form) is illustrated in the drawings and hereinafter more fully described.

In the drawings: Figure 1 is a central vertical section taken through a container embodying the principles of our invention mounted in a position upon an illumination box for testing the eggs in the container. Fig. 2 is a top plan view partly broken away of the container with the covers closed. Fig. 3 is a side elevation partly broken away and shown in section, of a crate with a number of containers embodying the principles of our invention packed therein. Fig. 4 is a corner detail view of one of the containers, illustrating the tongue and slot connection thereof in dotted lines. Fig. 5 is a view similar to Fig. 1, showing a modified form of container. Fig. 6 is a sectional view illustrating the container shown in Fig. 5 inverted and ready for deposit in a crate. Fig. 7 is a side elevation partly broken away and shown in section of a crate with a number of containers constructed as shown in Fig. 5, packed therein. Fig. 8 is a top plan view of a collapsible partition member partly collapsed, which is used in a container. Fig. 9 is a detail illustrating the connection between the transverse and longitudinal collapsible partition walls of the partition members. Fig. 10 is a section taken on line 10—10 of Fig. 9.

As shown in the drawings: The illumination box with which a container embodying the principles of our invention is used for testing eggs, may be of any suitable construction, but for the purposes of illustration we have shown a simple type thereof well adapted for the purpose, although of course numerous modifications or changes in the structure thereof may be provided to facilitate the use thereof, such as switches, reflectors, and other well known attachments. The illumination box consists of side walls 1, and a bottom 2, and mounted therein is an incandescent bulb 3. The interior walls and bottom of said illumination box may be preferably enameled white to secure an even distribution of light and, extending peripherally around the interior of said box is a molding strip 4. The size of the box is such as to permit insertion of an egg container for testing purposes therein, as is shown in Figs. 1 and 5, the container resting upon said peripheral molding strip and fitting within the side walls 1, thus effectually sealing the rays of light from the box around the edges of the container. The container consists of a sheet of cardboard, fiber, or other suitable material, creased along four lines of fold affording a floor 5, having a plurality of apertures 6, therein, and with side walls 7 and 8, and the side walls 7, are also creased and provided with an integral extending portion of the cardboard or other material of which the container may be constructed, to afford covers 9. As clearly shown in Fig. 4, for the purpose of connecting the side walls 7 and 8, at the corners of the container, each of the side walls 7, is provided with an angled slot 10, and the ends of the side walls 8, are provided with a notched tongue 11, adapted to be inserted therethrough to hold said respective side walls in proper relation standing uprightly and at right angles to the floor or bottom 5.

Removable collapsible partition members 12 and 13, are detachably and adjustably connected together in the familiar manner well known in the art, the same being commonly used in practically all egg containers. The connection between the respective longitudinal and transverse members 12 and 13, of the partition member within the carton, is clearly shown in Figs. 9 and 10, each of the members 12, having a curved slot 14, and a projecting angular tongue 15, cut inwardly from the upper edge thereof to near the middle of the member. The members 13, are each provided with a slot 16, cut from the lower edge thereof upwardly to near the middle thereof, and with another small slot 17, in line therewith, so that the tongue 15, of the member 12, projects through the small slot 17. This permits the partition member to be collapsed, such an adjustment thereof being shown in Fig. 8, in which said member is partially collapsed.

The device for use as shown in Fig. 1, rests upon a molding 4, with the bottom or floor 5, of the container supported thereon, and with the eggs 18, of which only two are shown, fitting and projecting partly through the respective apertures 6, thereby sealing the light from within the illuminating box. The device as used in a dark room with the intense light from one or more bulbs 3, permits an operator to readily detect a bad egg in the carton with the covers 9, swung back in the position shown in Fig. 1. After examination of the same, the carton is placed into a crate 19, having a central partition member 20, and, as shown in Fig. 3, the respective cartons containing the eggs are inverted with the covers 9, disposed beneath, and the apertured floor 5, above a series of packed cartons in the crate being denoted by the numerals 21, 22, 23, 24, and 25, respectively.

In the modification of our invention illustrated in Figs. 5, 6, and 7, the carton is constructed in an exactly similar manner, that is, with a floor 26, and apertures 27, therein, and side walls 28 and 29, respectively, but in the present instance the side walls 28, are not provided with the covers similar to the covers 9, of the previous construction, the cartons being left open on the top side. When the carton is placed within a crate 30, a sheet of cardboard or other suitable material 31, is laid thereover, and then the carton is inverted, as shown in Fig. 6, that is, with the apertures 27, on the top side, and the next successive carton is laid thereon in a similar inverted position with the eggs 18, in the cartons in the position shown in Fig. 6.

The operation is as follows: The eggs are placed into the carton as shown in Fig. 1, with the small end of the eggs directed downwardly to interfit and project through the apertures 6, in the floor 5. The carton is then placed upon the illumination box, with the carton covers open to permit the tester to simultaneously observe all of the eggs contained in the carton. After testing the covers are closed and the carton is placed in a packing case in an inverted position ready for shipment.

In the modified form of the device, the testing process is similar to that above described with the exception that a sheet of cardboard, or other material, is used in place of covers to form a bottom for the carton when the same is inverted and laid within a crate for shipment.

We are aware that various details of construction may be varied through a wide range, and the construction herein illustrated and described is only of a preferred and simple form, and other modifications will readily suggest themselves to one familiar and skilled in the art. However, we do not purpose limiting the patent granted except as limited by the prior art.

We claim as our invention:

1. In a device of the class described, the combination of a packing case with a plurality of collapsible cartons, each made from a single sheet of foldable material, having a perforated bottom, and covers adapted to be folded over the carton and completely cover the top thereof to serve as a spacing member between the cartons when arranged in superposed position within the packing case, and adapted in another position to serve as handles.

2. In a device of the class described, the combination of a packing case with a plurality of collapsible cartons, each constructed from a single sheet of foldable material, having a perforated bottom and having integral imperforate members adapted in one position to fold over the carton to cover the same, and in another position to serve as handles.

3. In a collapsible egg container testing device having a plurality of apertures in the base thereof, one for each egg within the container, imperforate doors integral therewith serving as handles for moving the device, said container adapted to be fitted within an illuminating box by means of said handles to permit testing of the eggs.

4. In a device of the class described, the combination of an egg packing case with a plurality of collapsible cartons, each composed of a single sheet of foldable material, having an apertured bottom, integral interfitting side walls, and having imperforate covers integral with certain of said walls adapted in one position to be disposed over the carton to completely cover the same and serve as a supporting member between the cartons when arranged in superposed position within the casing, and adapted in another position to serve as handles for the carton.

5. In a device of the class described, the combination of a packing case with a plurality of collapsible cartons, each made from a single sheet of foldable material, having a perforated bottom, and having imperforate cover members adapted in one of their positions to be folded over the carton and completely cover the top thereof to serve as a spacing member between the cartons when arranged in superposed position within the casing, and adapted in another position to serve as a handle.

In testimony whereof we have hereunto subscribed our names in the presence of two subscribing witnesses.

ALEX L. ANDERSON.
WILLIAM V. PURDY.

Witnesses:
J. T. GREENWOOD,
C. A. ROFF.